May 20, 1924.
G. F. SMITH ET AL
BALL BEARING SLEEVE REMOVER
Filed Aug. 6, 1923
1,494,386
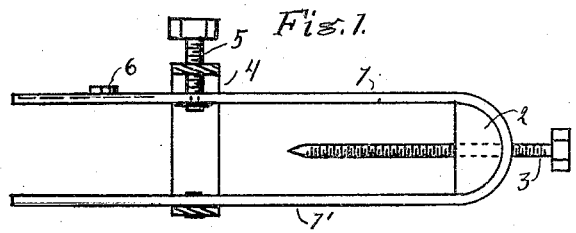
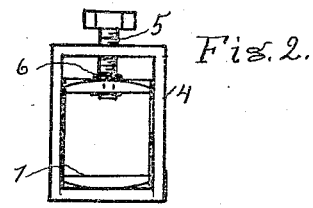
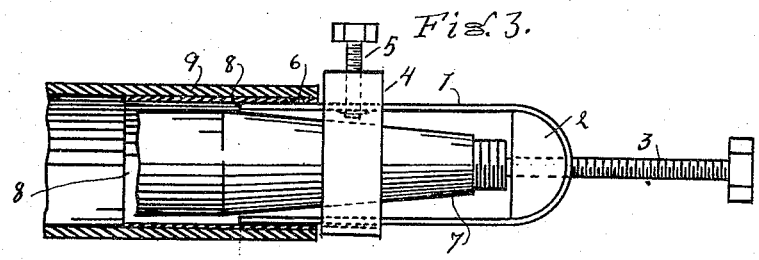
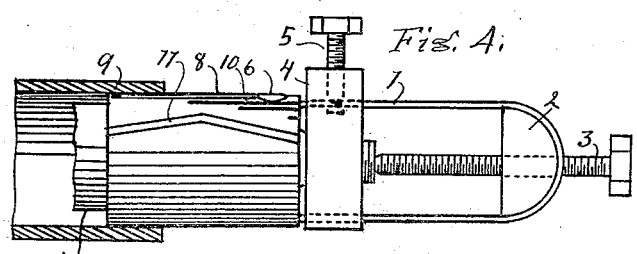
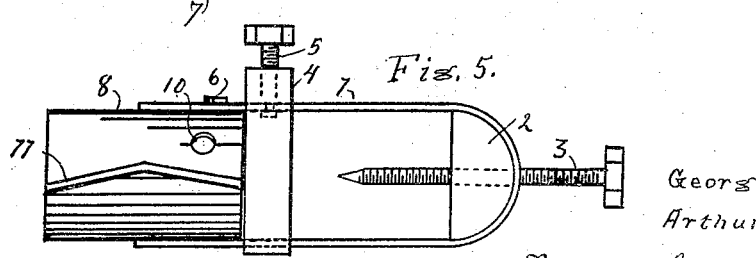
Inventor
George F. Smith,
Arthur Post,
By
Ithiel J. Cilley
Attorney Patented May 20, 1924.

1,494,386

UNITED STATES PATENT OFFICE.

GEORGE F. SMITH AND ARTHUR POST, OF SPARTA, MICHIGAN.

BALL-BEARING-SLEEVE REMOVER.

Application filed August 6, 1923. Serial No. 655,845.

*To all whom it may concern:*

Be it known that we, GEORGE F. SMITH and ARTHUR POST, citizens of the United States, residing at Sparta, in the county of Kent and State of Michigan, have invented certain new and useful Improvements in Ball-Bearing-Sleeve Removers, of which the following is a specification.

Our invention relates to improvements in appliances for removing the ball bearing sleeve from the hind axletree casing of an automobile, and its objects are: first, to provide a means whereby the said sleeves may be removed at any time and place and without great inconvenience or trouble; second, to provide a means whereby said sleeves may be readily removed without danger of injuring them, and, third, to provide an implement of the kind named that may be readily converted into a clamp for compressing the sleeves and reinserting them into the axletree casing.

We attain these objects by the mechanism and construction and arrangement of parts shown in the accompanying drawing, in which Fig. 1 is an elevation of the implement detached from a sleeve, and with the clamping yoke shown in section. Fig. 2 is an end view of the implement and the clamping yoke. Fig. 3 shows a sectional elevation of the axletree casing and sleeve with the end of the axletree in place and our implement in place, and in position for drawing the sleeve out of the casing. Fig. 4 shows the position of the implement when the sleeve has been partly drawn from the casing, and, Fig. 5 shows the manner of applying the implement for compressing the sleeve to reinsert it into the casing.

Similar reference numerals indicate similar parts throughout the several views.

The body, or arms, 1, of this implement is made of spring steel of practically the form shown in the several views, and has a solid nut member, 2, through which the bolt or screw 3 passes. It is, also, provided with a yoke 4 that passes over the ends of the arms 1 and is provided with a screw or bolt 5 by means of which the arms of the implement may be forced together, or apart, as desired, for entering them into, removing them from or clamping them upon the sleeve 8. All of these sleeves are made with an open slot, as indicated at 11, to allow for compression and expansion of the sleeve, as desired for entering the sleeve into the casing 9, or for removing it from said casing. At the upper side of one of the arms 1 is formed a projecting knob 6 near the outer end thereof, which is designed to be passed through the opening 10 in the sleeve. where it is firmly set by screwing outwardly upon the bolt 5, and when in position the end of the axletree 7 is positioned near the nut 2 and the pointed end of the bolt 3 is made to contact it, as indicated in Fig. 3, when, by screwing the bolt 3 firmly and continually against the end of the axletree the sleeve 8 will be withdrawn from the casing 9, as indicated in Fig. 4, when, by screwing the bolt 5 inwardly against the arm 1 the sleeve will be relieved and can be readily removed from the implement.

While the implement may be made to work with perfect success and satisfaction with the yoke loosely mounted thereon, as indicated in Fig. 2, it is preferable, especially when using it for opening, or spreading the arms to pass them over the sleeve for compressing it, that this yoke be riveted to the arm 1' as otherwise the arms could not be properly spread.

When using this implement as a compresser for entering, or, rather, for compressing the sleeve to insert it into a casing, the arms 1 and 1' must be spread sufficiently to pass the sleeve easily between them after which the arms should be forced against the periphery of the sleeve until the sleeve is compressed sufficiently to be made to enter freely into the casing for a sufficient distance to insure its perfect seating after the clamp has been removed.

It will be readily understood that the countersink in the end of the axletree, for centering in a lathe when turning up the axletree, will answer as a perfect bearing for the pointed end of the bolt 3 to hold it in perfect alinement when drawing the implement lengthwise to remove a sleeve from the axletree casing, as above set forth.

Having thus fully described our invention, what we claim as new in the art, is:

1. In an implement for removing ball bearing sleeves from the casings of an automobile axletree, a body made of spring steel and having two flexible arms, one of said arms having a knob on its outer surface near the end thereof, a clamp surrounding said arms, a screw bolt mounted in one side of said clamp for varying the distance between the ends of said arms, and means for drawing heavily upon said implement longitudinally of the sleeve and the implement.

2. In an implement for removing ball bearing sleeves from the axletree casings of an automobile, parallel spring arms mounted upon a supporting nut, a yoke surrounding said arms and firmly secured to one of said arms, a bolt mounted into the other end of said yoke with its free end passing through an opening in the other arm and so connected therewith that by turning said bolt the said arms may be drawn apart, or forced toward each other, and a means for drawing longitudinally upon said implement.

3. In an implement for removing and replacing ball bearing sleeves in the casings of automobile axletrees, a body consisting of integrally connected spring arms positioned parallel with each other, a supporting nut securely connected with said arms, a bolt passing through said nut in position to be made to press against the end of an axletree and force the implement to move longitudinally therefrom, a yoke and adjusting bolt arranged to force the free ends of said arms towards or from each other, and an engaging knob upon the outer surface of one of said arms in position to engage the opening in the sleeve to draw the sleeve, with the implement, out of the axletree casing by the action of the bolt against the end of the axletree.

Signed at Sparta, Michigan, August 2nd, 1923.

GEORGE F. SMITH.
ARTHUR POST.